United States Patent
Guardiola et al.

[11] Patent Number: 5,462,144
[45] Date of Patent: Oct. 31, 1995

[54] IMPACT-ABSORBER DEVICE

[75] Inventors: Pierre-Henri Guardiola, Chatenois Les Forges; Van-Tha Iv, Cravanche; Albert Metzger, Hartmannswiller; Louis-Marie Cleon, Paris La Defense; Marwan Dannawi, Nantes, all of France

[73] Assignee: Gec Alsthom Transport Sa, Paris, France

[21] Appl. No.: 227,010

[22] Filed: Apr. 13, 1994

[30] Foreign Application Priority Data

Apr. 23, 1993 [FR] France ................................. 93 04823

[51] Int. Cl.⁶ .................... F16F 7/12; B61D 17/00
[52] U.S. Cl. .................... 188/377; 105/416; 296/189; 293/132
[58] Field of Search .................... 188/371, 377; 293/102, 132, 133; 296/189, 188, 146.6; 213/1 A, 220, 9; 105/392.5, 416, 417, 418

[56] References Cited

U.S. PATENT DOCUMENTS

| 1,989,834 | 2/1935 | Watson | 105/416 X |
|---|---|---|---|
| 2,091,195 | 8/1937 | Dennebaum. | |
| 2,620,751 | 12/1952 | Watter | 105/416 |
| 3,540,384 | 11/1970 | Charles | 105/418 |
| 3,659,724 | 5/1972 | Miller et al. | 105/416 X |
| 3,756,904 | 9/1973 | Fredericks. | |
| 4,029,350 | 6/1977 | Goupy et al. | 188/377 X |
| 4,684,151 | 8/1987 | Drewek | 296/189 X |
| 4,864,938 | 9/1989 | Hesch et al. | 105/416 X |

FOREIGN PATENT DOCUMENTS

| 123880 | 7/1988 | Canada. | |
|---|---|---|---|
| 0517377A1 | 12/1992 | European Pat. Off.. | |
| 13040 | 12/1956 | Germany | 105/416 |
| 1173925 | 7/1964 | Germany. | |
| 45484 | 3/1985 | Japan | 296/188 |
| 486602 | 4/1970 | Switzerland. | |
| 1464031 | 2/1977 | United Kingdom. | |

*Primary Examiner*—Robert J. Oberleitner
*Assistant Examiner*—Kevin D. Rutherford
*Attorney, Agent, or Firm*—Sughrue, Mion, Zinn, Macpeak & Seas

[57] ABSTRACT

The invention concerns an impact-absorber device comprising at least one mechanical member absorbing by deformation the energy generated by an impact in a given direction, wherein said member is made from thin plate, having a cross-section in a plane perpendicular to the direction of impact in the shape of at least two triangles each having a common vertex. Applications to rail vehicles, for example.

15 Claims, 7 Drawing Sheets

IMPACT-ABSORBER DEVICE

BACKGROUND OF THE INVENTION

The invention concerns an impact-absorber device.

Some prior art impact-absorber devices are in the form of reversible deformation systems based on dissipation of energy by dry or viscous friction. In rail transport applications they are incorporated in the buffers and in the bodies of automatic couplings. These systems have the drawback of a low unit energy absorption capability, around 50 kJ per unit.

Another impact-absorber device is the shield disposed on the motive power unit of a train, especially high-speed trains. The shield has a honeycomb or tube construction deforming in compression. It is a large member attached to the train and has the drawback that it does not contribute to the transmission of longitudinal forces in the chassis. Also, it protects only the driver.

The safety of train passengers in the event of a collision is currently a matter of great concern. Increasing train speeds increase the danger in the event of an accident. A recent spate of accidents has shown that improvements in signalling have not eliminated all risks of collision.

An impact-absorber device that is more effective than current devices is therefore required. This device must, on impact, bring about collapse lengthwise of the axis of the motive power unit to prevent the latter skewing on the track. It must also be light enough to satisfy train axle load limits. It must also be compact in size, since space saving is most important both in the motive power units and in the passenger cars.

OBJECTS AND SUMMARY OF THE INVENTION

The present invention mitigates the drawbacks of the prior art and meets the stated requirements in terms of effectiveness, weight and overall size. It finds a particularly beneficial application in rail transport where the amount of energy to be absorbed on impact can be considerable. It can nevertheless be used in other fields to absorb impact between a moving vehicle and an obstacle or between two moving vehicles (cars, lifts, etc).

The effectiveness of the proposed device resides in the specific shape of its section transverse to the direction of impact.

The invention consists in an impact-absorber device comprising at least one mechanical member absorbing by deformation the energy generated by an impact in a given direction wherein said member is made from thin plate, having a cross-section in a plane perpendicular to the direction of impact in the shape of at least two triangles each having a common vertex.

Said member can have strengthening members disposed between the two triangles and in planes perpendicular to the direction of impact.

Said member can have stamped areas. These areas initiate the deformation and also reduce the force required to bring about the deformation.

The two triangles can be identical and face in opposite directions.

Said member can include thin plates closing the inside corners between the two triangles. The member can be made of steel.

The cross-section of the member can have parts with different yield stresses.

The member can be made from thin plates bent and welded together to form said cross-section. This has the advantage of making it easier to manufacture.

The invention also consists in a vehicle including in its framework at least one impact-absorber device as defined above placed between undeformable parts of the framework.

The impact-absorber device is advantageously inserted into the chassis of the vehicle.

The chassis comprising side sills and sole bars, the device can comprise members substituted for the side sills and the sole bars of the chassis.

The chassis can include an impact-absorber device at the front of the vehicle, this device comprising a central member on the vehicle axis and two lateral members disposed to form a V-shape pointing towards the front of the vehicle.

These lateral members can have hollow rectangular cross-sections with a single diagonal.

If the vehicle is a rail vehicle having a rear crossbeam and a pivot beam corresponding to the adjacent bogie, the device can be inserted into the chassis between the rear crossbeam and said pivot beam.

BRIEF DESCRIPTION OF THE DRAWINGS

The invention is explained in more detail and other features and details of the invention emerge from the following description given by way of non-limiting example with reference to the accompanying drawings, in which.

MORE DETAILED DESCRIPTION

Figure 1:
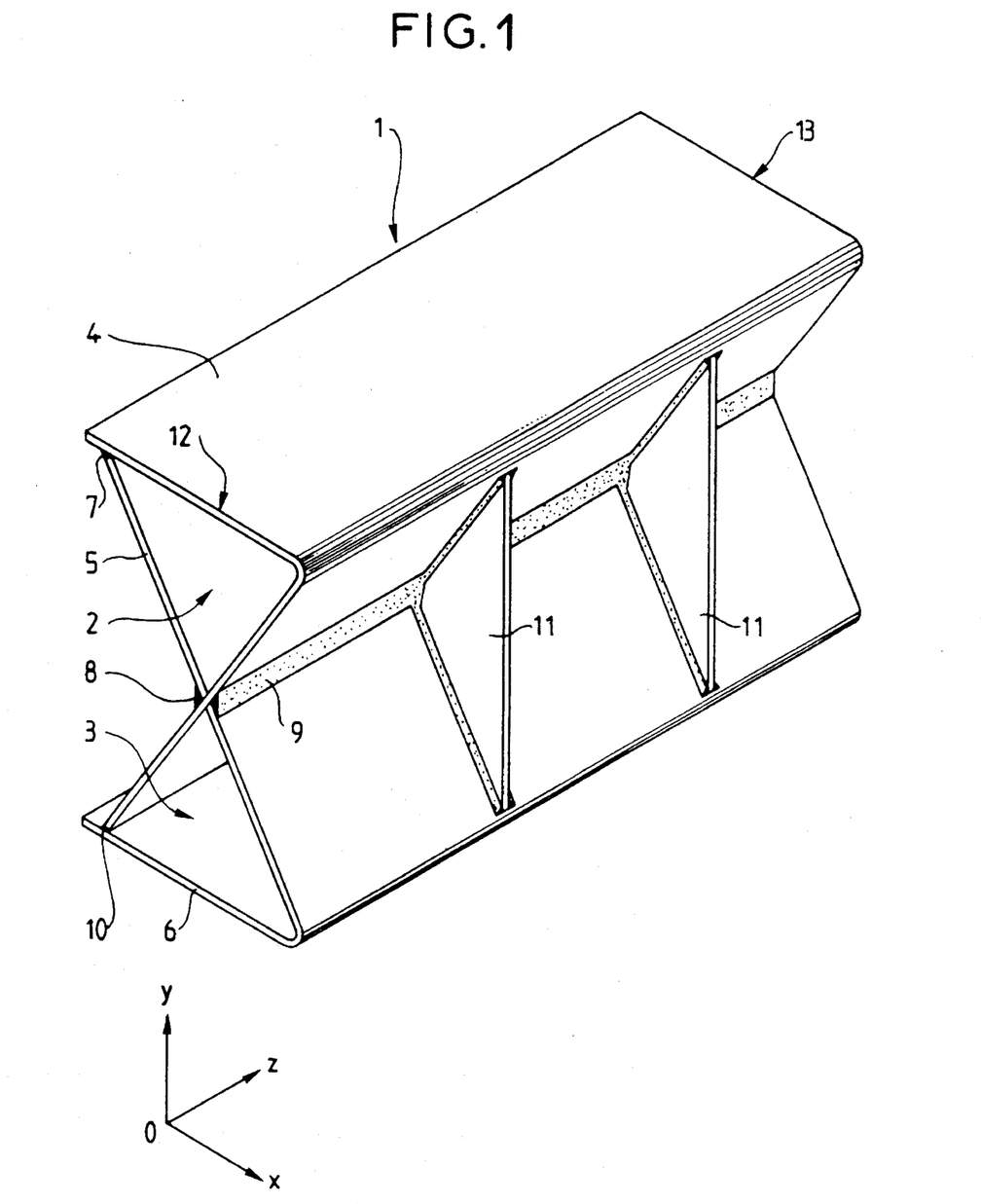
FIG. 1 shows an impact-absorber device of the invention constituted by a single longitudinal member.

The impact-absorber device shown in FIG. 1 comprises a single longitudinal member 1 aligned with the impact direction Oz. The cross-section of this member is in the xOy plane perpendicular to the impact direction and it is in the shape of two triangles 2 and 3 having a common vertex. The sides of the triangles 2 and 3 are the metal walls of the member 1. The sides of the triangles can be straight or slightly curved. The vertices of the triangles can optionally be rounded, as shown in the figure.

The member 1 is made from thin plate. In the case of FIG. 1 it is constructed from three plates 4, 5 and 6 welded together by weld beads 7, 8, 9 and 10. The plates 4 and 6 are bent to form two corners of the triangles 2 and 3.

The material from which the thin plates is made depends on the amount of energy that the device is intended to absorb. Steel allows a large amount of energy to be absorbed.

The member 1 is made from thin plate so that in the event of an impact of sufficient energy it collapses concertina fashion in the direction of impact. Impact tests have shown that this structure behaves in a doubly advantageous manner. Firstly, it can collapse by about 70% of its original length, which is exceptional. Secondly, it collapses without any generalised buckling of the member, which collapses without any change in its direction.

The thickness of the thin plate depends on the outside dimensions of the member. The member must be able to collapse concertina fashion on impact due to localized buckling of the thin plates. Calculation and experiments can optimise the thickness as a function of the outside dimensions of the member for a given amount of energy to be absorbed.

For reasons of symmetry the best results are obtained for a cross-section of the member including two identical triangles facing in opposite directions. In other words, the cross-section is X-shape with two opposite sides closed.

In use, or for the purposes of an impact test, the ends 12 and 13 are welded to respective brackets, the member having to absorb the energy associated with an impact by virtue of its deformation. The member collapses concertina fashion substantially within its original outline.

Localized strengthening members 11 can be provided between the two triangles 2 and 3 in planes perpendicular to the impact direction. They are advantageously attached by welding and improve the torsional stability of the member 1.

Figure 2:
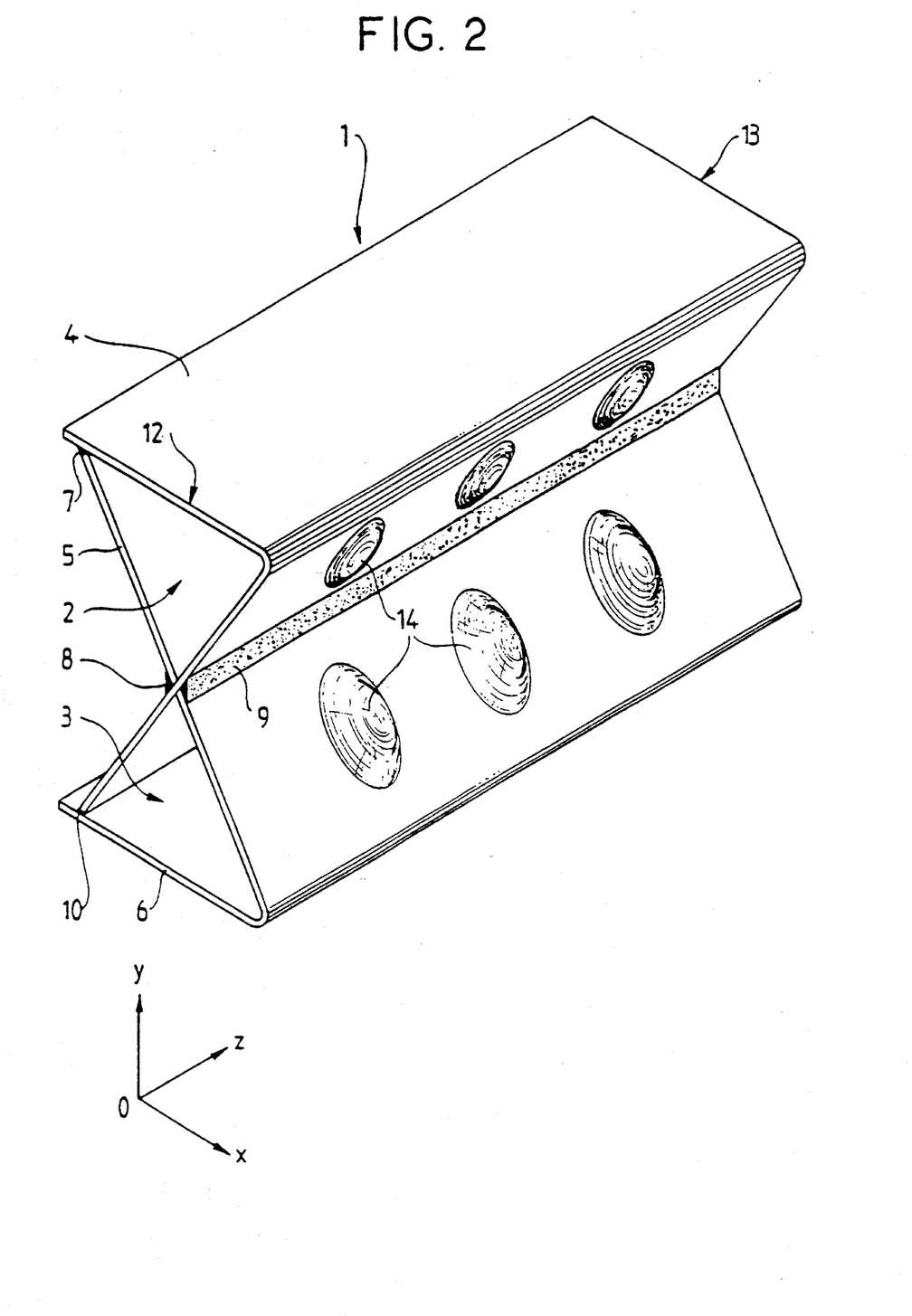
FIG. 2 shows a different embodiment of the impact-absorber device of the invention.

In the embodiment shown in FIG. 2 the plates 4, 5 and 6 are stamped in localized areas like the areas 14. The shape and location of the stamped areas can be determined by calculation and experiment.

Figure 3:
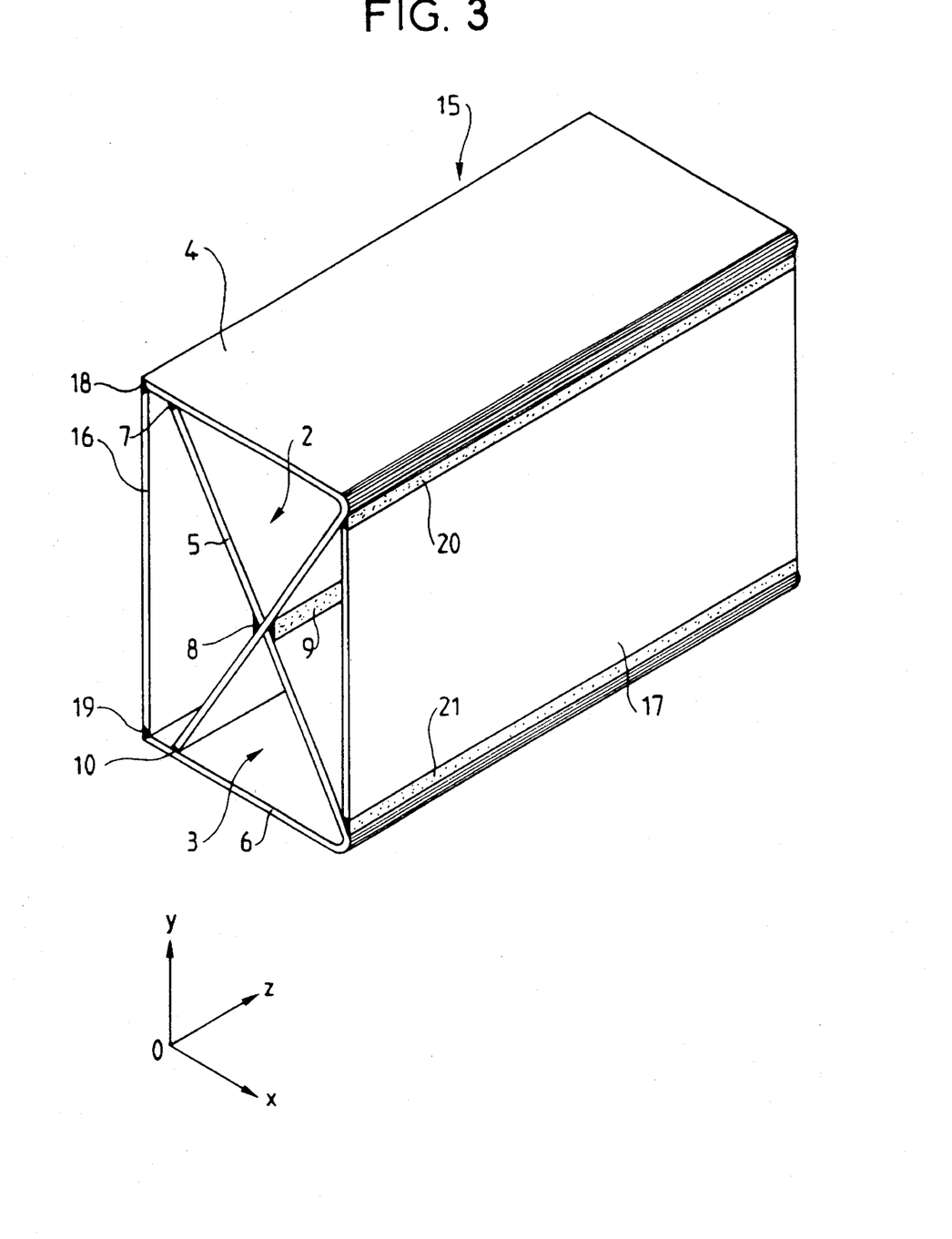
FIG. 3 shows a further embodiment of the impact-absorber device of the invention.

The device 15 shown in FIG. 3 can absorb impacts of greater energy than the device described above. The basic structure is the same as that of FIG. 1 and the same component parts are identified by the same reference numbers. The corners between the triangles 2 and 3 are now closed by thin plates 16 and 17 welded by respective weld beads 18, 19 and 20, 21 to the remainder of the member.

If collapse along the Oz axis occurs as previously described the plates 16 and 17 become corrugated, the outline of the member remaining approximately the same.

An impact-absorber device can combine a plurality of members like the members 1 and 15 in parallel to absorb impact over a relatively large area. A device of this kind can be used on rail vehicles to absorb violent impact occurring in the event of an accident. In this case it is particularly advantageous to integrate the device into a rail vehicle chassis to constitute a "fuse" area to protect against the consequences of an accident.

Figure 4:
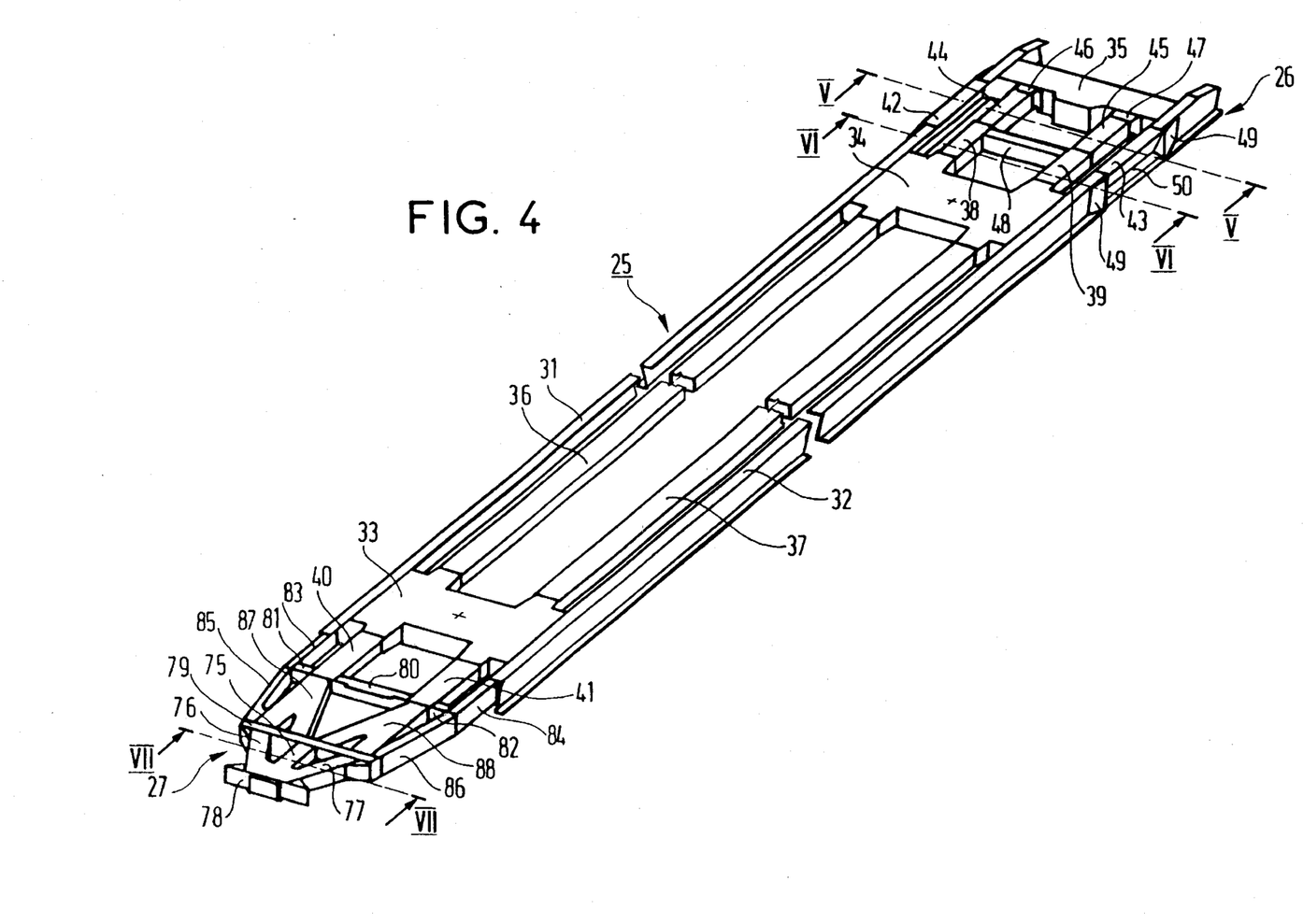
FIG. 4 shows a rail vehicle chassis incorporating impact-absorber devices of the invention.

FIG. 4 shows a rail vehicle chassis 25 including two impact-absorber devices 26 and 27 in accordance with the invention. The chassis comprises two side sills 31 and 32 between which are two pivot beams adapted to rest on bogies: the front pivot beam 33 and the rear pivot beam 34. At the rear, the side sills 31 and 32 are joined by a rear crossbeam 35. At the front the side sills 31 and 32 and the front pivot beam 33 are extended by a front part including the impact-absorber device 27.

Sole bars 36 and 37 interconnect the pivot beams 33 and 34. They are accompanied by other sole bars: the sole bars 40 and 41 extending forwardly from the pivot beam 33.

At the rear of the chassis 25 the impact-absorber device 26 is disposed between the rear crossbeam 35 and the ends of the side sills 31, 32 and the pivot beam 34. The device 26 includes a plurality of members. The members 42 and 43 on the outside are inserted into the side sills 31 and 32. The members 44 and 45 on the inside extend the members 38 and 39 as far as the rear crossbeam 35.

For the energy absorbing members to collapse effectively in the event of a violent impact the other component parts of the chassis must be much less deformable than the members 42, 43, 44 and 45. Localized strengthening of the chassis framework can achieve this.

As the space around a pivot beam is usually congested, the length of the device 26 has deliberately been kept small. The members 42 and 43 are longer than the members 44 and 45 (see FIG. 3).

The members 44 and 45 are welded to the rear crossbeam 35 via reinforced portions 46 and 47 which widen in the direction towards the rear crossbeam 35. The portions 46 and 47 provide bases for the members 44 and 45. The member 44 is welded to the member 38 with a metal plate between them providing a base for the member 44. The same applies to the joining of the members 45 and 39. An intermediate crossbeam 48 is welded between the members 38 and 39 near the members 44 and 45.

The members 42 and 43 are welded to the side sills 31 and 32 with metal plates providing bases for these members between them. The side sills are strengthened where they are joined to the members 42 and 43 by strengthening parts 49. These strengthening parts and the proximity of the pivot beam 34 and the rear crossbeam 35 stiffen the side sills so that these portions of the latter can be regarded as undeformable compared to the impact-absorber device.

Figure 5:
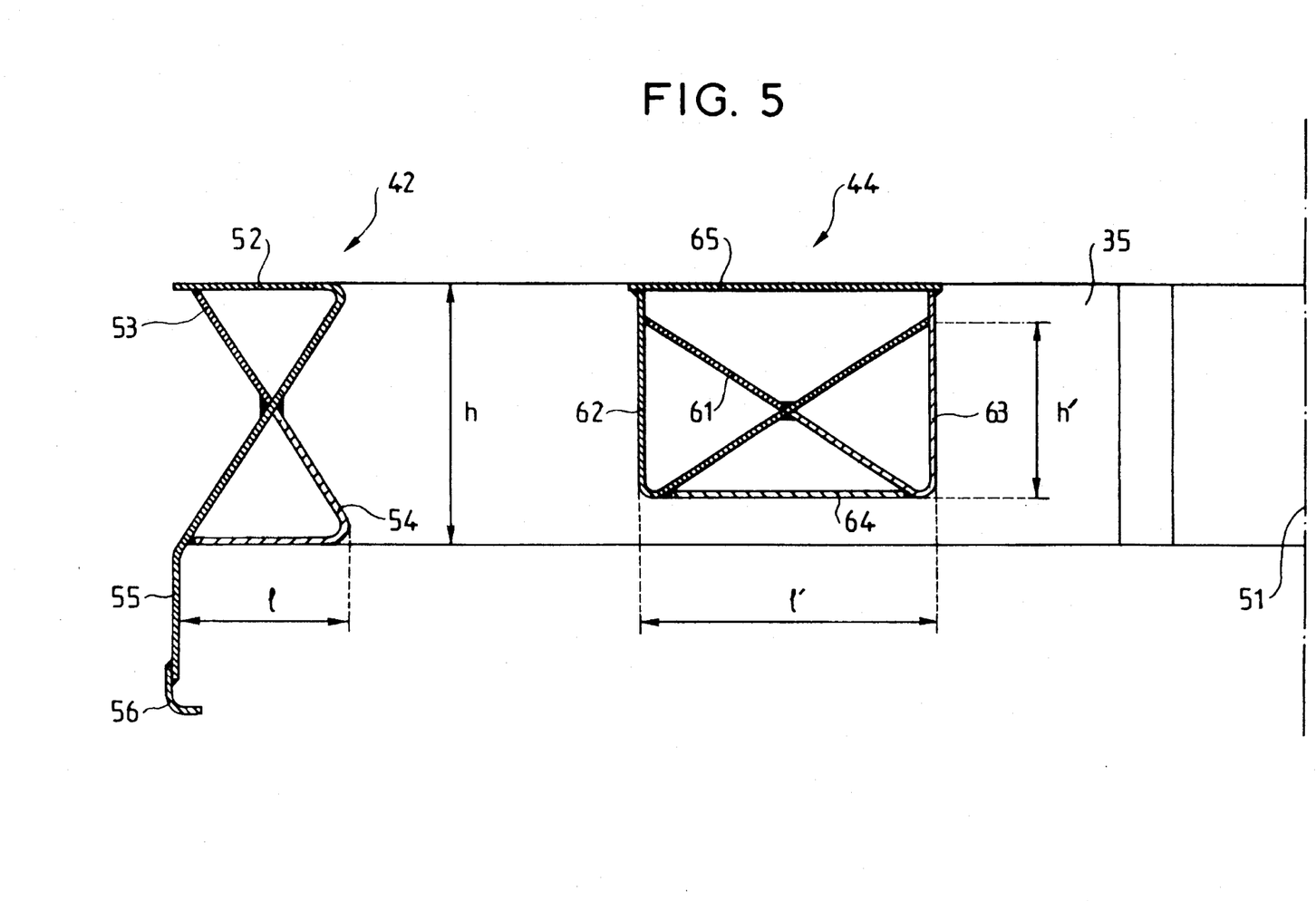
FIG. 5 shows part of the rail vehicle chassis from FIG. 4 in cross-section on the line V—V.

FIG. 5 shows only the lefthand part of the cross-section plane V—V shown in FIG. 4, the righthand part being a mirror image of the lefthand part. The axis 51 is the central vertical axis of the vehicle. The members 42 and 44 are seen in cross-section. The member 42 is of the type shown in FIG. 1. It is made up of a plurality of thin plates 52, 53 and 54 bent as necessary and welded together. For joining on the side plates it is necessary to add an appendix 56 in the lower portion welded to the extension 55 of the plate 52. This has no unwanted repercussions on the system.

The member 44 is of the type shown in FIG. 3. It is made up of a plurality of thin plates 61, 62, 63, 64 and 65 bent as necessary and welded together. The member 44 therefore has the same outside shape as the sole bars of the chassis.

The stress concentrations in the cross-sections of the members 42 and 44 are non-uniform and it is possible to compensate for the different stresses by using different grades of the materials. With the chassis made from high yield stress steel (E490D grade), for example, the plates 52, 53, 61, 62 and 65 can be made from E24 grade steel, the plates 63 and 64 from E36 grade steel and the plates 55 and 56 from E490D grade steel.

The plates can be 4 mm thick for a height h of 195 mm and a width l of 110 mm for the member 42 and for a height h' of 130 mm and a width l' of 220 mm for the member 44.

Figure 6:
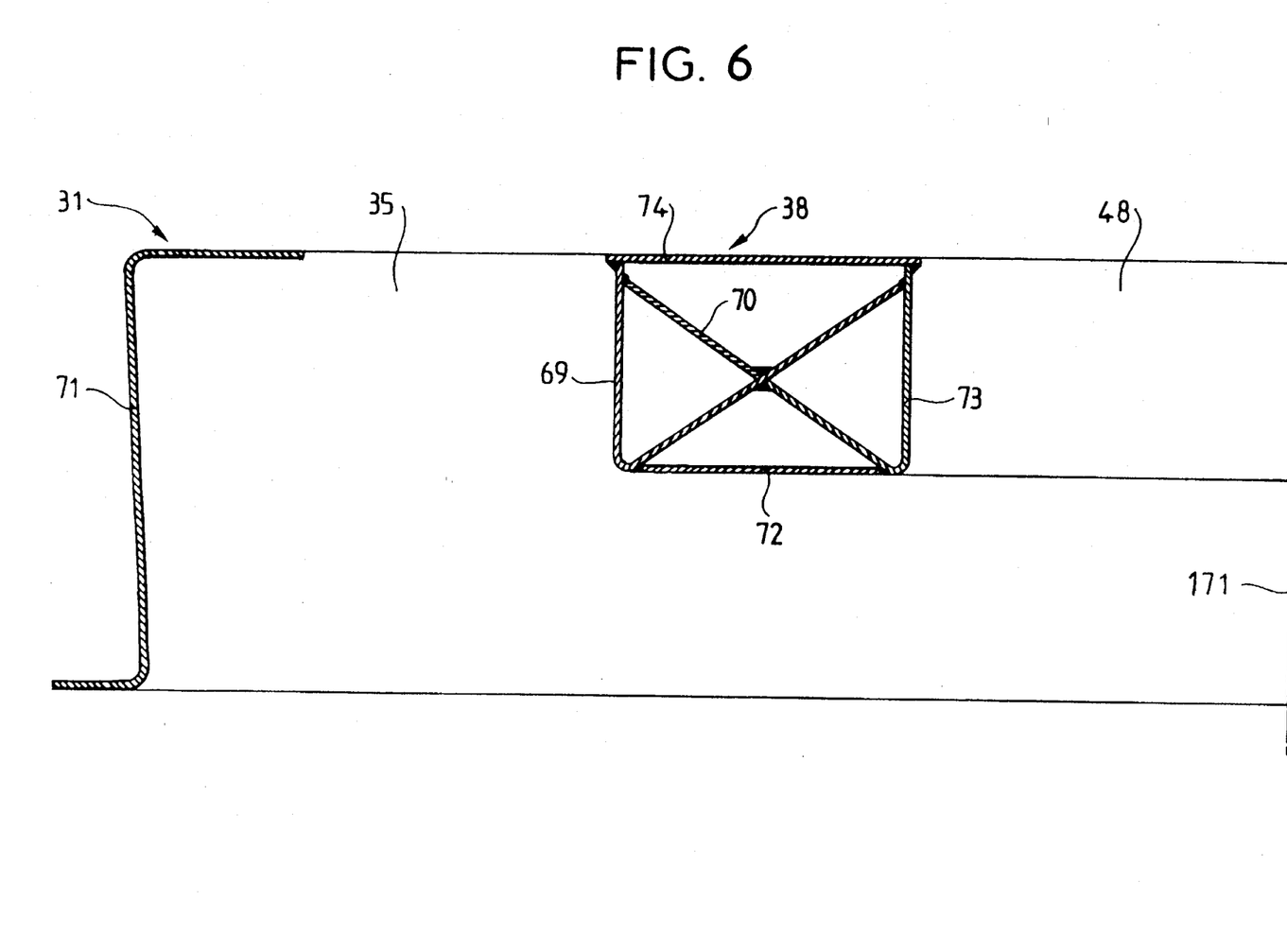
FIG. 6 shows part of the rail vehicle chassis from FIG. 4 in cross-section on the line VI—VI.

FIG. 6 shows only the lefthand part of the cross-section plane VI—VI shown in FIG. 4, the righthand part being a mirror image of the lefthand part. The axis 171 is the central vertical axis of the vehicle. The side sill 31 and the member 38 are seen in cross-section. The side sill 31 is made from bent plate 71.

The member 38 is made by welding together plates 69, 70, 72, 73 and 74.

At the front of the chassis (see FIG. 4) the impact-absorber device 27 comprises a central member 75 disposed along the central longitudinal axis of the vehicle and two side members 76 and 77 arranged in a forward-pointing V-shape. This device is between a front end plate 78 adapted to take any impact and a crossbeam 79 joined to the remainder of the chassis by a rigid mechanical structure transmitting forces between the crossbeam 79 and the front pivot beam 33. This rigid structure comprises the sole bars 40 and 41, the crossbeams 80, 81 and 82 and the girders 83, 84, 85, 86, 87 and 88.

Figure 7:
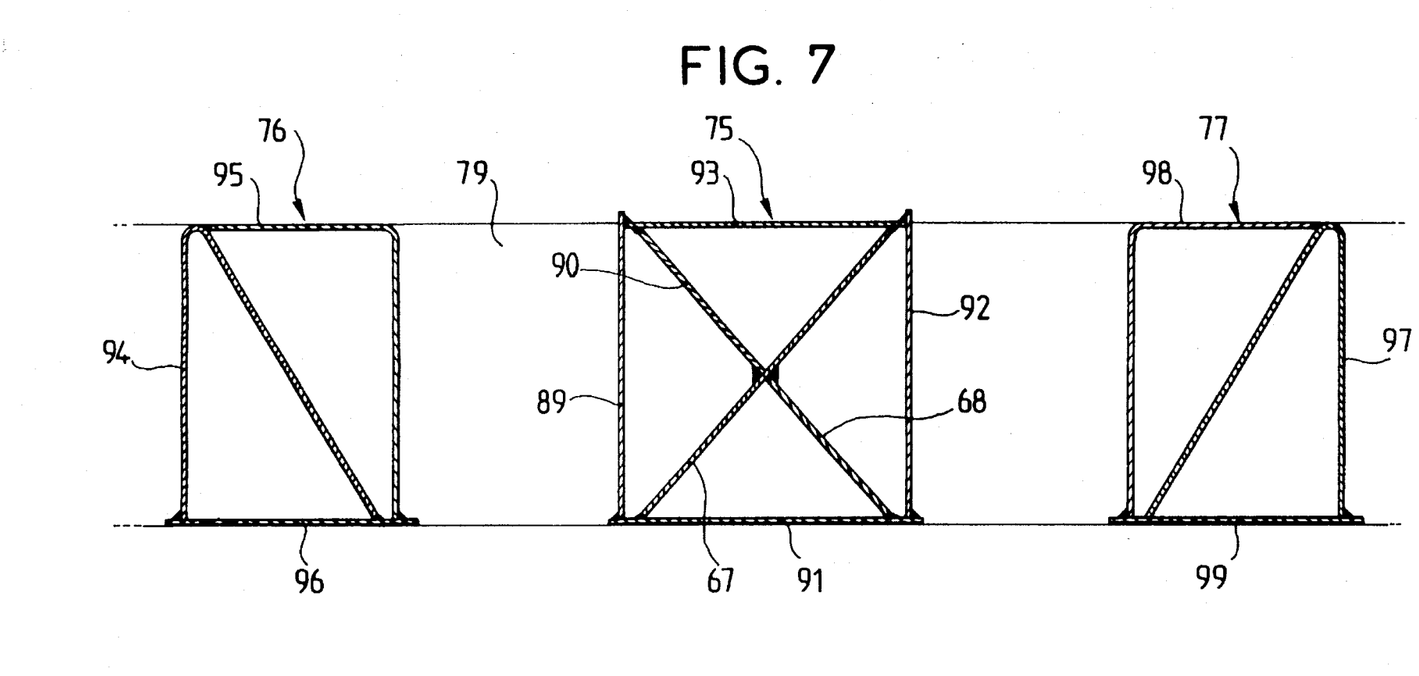
FIG. 7 shows the rail vehicle chassis from FIG. 4 in cross-section on the line VII—VII.

FIG. 7 shows the members 75, 76 and 77 in cross-section. The member 75 is of the type shown in FIG. 3. It is formed from a plurality of thin plates 89, 90, 91, 92, 93, 67 and 68 welded together.

The members 76 and 77 do not have the X-shape structure which is characteristic of the invention. The member 76 is made up of a plurality of thin plates 94, 95 and 96 bent as necessary and welded together. The plate 94 forms a diagonal of the rectangle of the cross-section of the member 76. This diagonal runs from the top lefthand corner to the bottom righthand corner.

The member 77 is made up of a plurality of thin plates 97, 98 and 99 bent as necessary and welded together. The plate 97 forms a diagonal of the rectangle of the cross-section of the member 77. This diagonal runs from the top righthand corner to the bottom lefthand corner.

Making the impact-absorber device by forming and drawing is also within the scope of the present invention.

We claim:

1. An impact-absorber device comprising at least one deformable mechanical member absorbing by deformation the energy generated by an impact in a given direction wherein said member is made from thin plate, having a cross-section in a plane perpendicular to the direction of impact in the shape of a first and a second triangle, each having a common vertex;

wherein said first and said second triangle each have a respective base which is disposed opposite said common vertex; and wherein said base of said first triangle is disposed opposite said base of said second triangle.

2. A device according to claim 1 wherein said member has strengthening members disposed between the two triangles and in planes perpendicular to the direction of impact.

3. A device according to claim 1 wherein said member has stamped areas.

4. A device according to claim 1 wherein the two triangles are identical and face in opposite directions.

5. A device according to claim 1 wherein said member includes thin plates closing the inside corners between the two triangles.

6. A device according to claim 1 wherein said member is made of steel.

7. A device according to claim 1 wherein said cross-section has parts with different yield stresses.

8. A device according to claim 1 wherein said member is made from thin plates bent and welded together to form said cross-section.

9. A vehicle including in its framework at least one impact-absorber device according to claim 1 placed between undeformable parts of the framework.

10. A vehicle according to claim 9 wherein the device is inserted into the chassis of the vehicle.

11. A vehicle according to claim 10 wherein the chassis comprises side sills and sole bars and the device comprises members substituted for the side sills and the sole bars of the chassis.

12. A vehicle according to claim 10 wherein, being a rail vehicle having a rear crossbeam and a pivot beam corresponding to the adjacent bogie, the device is inserted into the chassis between the rear crossbeam and said pivot beam.

13. A vehicle according to claim 9 wherein said framework of said vehicle has a longitudinal axis and a front end which comprises:

said impact-absorber device as a central member on said longitudinal axis; and two lateral members disposed to form a V-shape pointing towards the front end of the vehicle.

14. A vehicle according to claim 13 wherein the lateral members have hollow rectangular transverse cross-sections with a single diagonal.

15. An impact-absorber device, comprising:

an upper and a lower plate portion;

a first and a second upper diagonal plate portion; and a first and a second lower diagonal plate portion;

said upper and said lower plate portion, said first and said second upper diagonal plate portion, and said first and said second lower diagonal portion extending along a common direction of impact;

said upper plate portion being connected to said first upper diagonal plate portion to define a first upper triangle vertex, and to said second upper diagonal plate portion to define a second upper triangle vertex;

said lower plate portion being connected to said first lower diagonal plate portion to define a first lower triangle vertex, and to said second lower diagonal plate portion to define a second lower triangle vertex;

said first upper triangle vertex being spaced from said second upper triangle vertex;

said first lower triangle vertex being spaced from said second lower triangle vertex;

said first upper diagonal plate portion being connected to said second upper diagonal plate portion to define a third upper triangle vertex;

said first lower diagonal plate portion being connected to said second lower diagonal plate portion to define a third lower triangle vertex;

said first upper diagonal plate portion and said second lower diagonal plate portion extending in a common plane;

said second upper diagonal plate portion and said first lower diagonal plate portion extending in a common plane; and said third upper triangle vertex and said third lower triangle vertex extending on a common axis along said direction of impact, defining an X shape;

wherein the impact-absorber device absorbs energy from an impact along the direction of impact by deformation.

\* \* \* \* \*